Aug. 23, 1955     W. D. CARPENTER     2,715,790
PLUG WITH OPTIONALLY USABLE WEIGHT AND HARNESS
Filed May 2, 1952
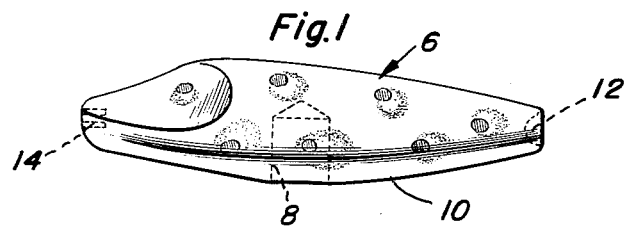
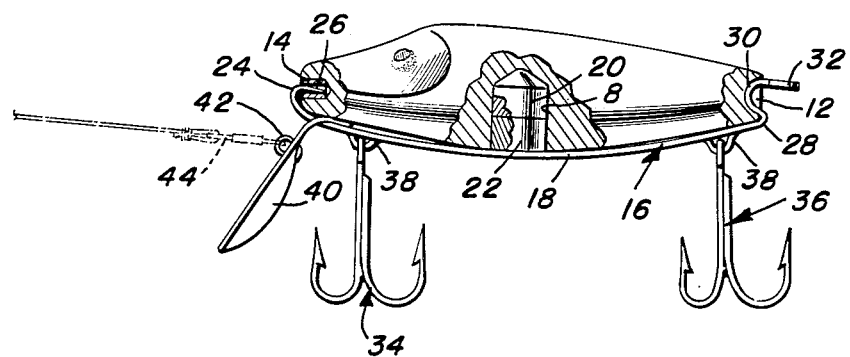
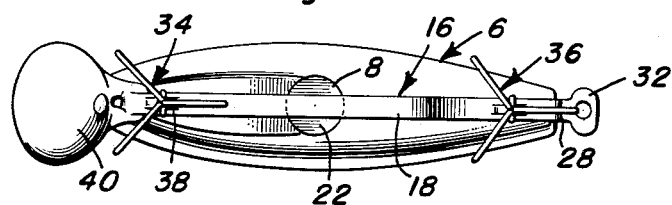
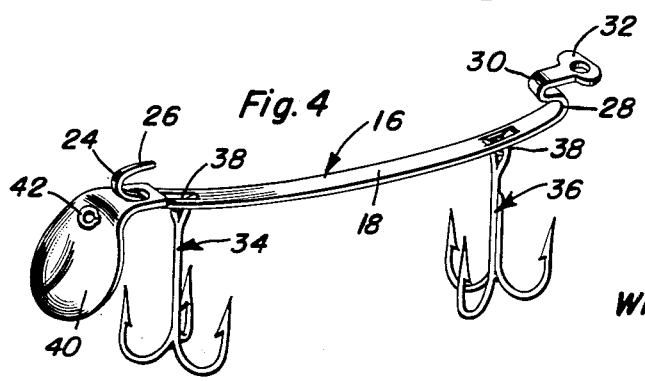
Wilbur D. Carpenter
INVENTOR.

United States Patent Office 2,715,790
Patented Aug. 23, 1955

2,715,790

PLUG WITH OPTIONALLY USABLE WEIGHT AND HARNESS

Wilbur D. Carpenter, Coffeyville, Kans.

Application May 2, 1952, Serial No. 285,649

1 Claim. (Cl. 43—42.09)

The present invention relates to certain new and useful improvements in artificial baits and lures and has more particular reference to a construction in this category which is characterized, generally speaking, by a suitably constructed and shaped plug and a harness which is separably connected with said plug, said harness being susceptible of carrying fish hooks which are either swingably or rigidly mounted, baffles, weed guards and the like.

A preferred embodiment of the invention has to do with a suitably designed plug having recess means, insertable and removable weights in the recess means plus the aforementioned harness wherein the harness serves not only as a carrier for the fish hooks and other accessories but, in addition, has a portion spanning the recess means in a manner to retain the weights in said recess means whenever one desires to employ one or more such weights.

Stated somewhat more specifically, one phase of the overall concept has to do with the adoption and use of variously colored and externally decorated plugs. The plugs are usually of standard length and cross-section. They are, however, provided at leading and trailing ends with axial socket means. On the center of the ventral portion each plug is provided with recess means which may be left empty or may be charged wholly or partly with weights, all in a manner to enable the user to cause the lure to ride either on the surface of the water or below the surface as conditions seemingly require.

A still further object and proportionately more specific aspect of the invention has to do with a combination of features as stated wherein the plug is removably saddled or equivalently mounted on a resilient harness, the harness conforming with and underlying the ventral side of the plug and holding the weight or weights in said recess means.

In addition, novelty is predicated on a plug having selectively usable weights mounted in the recess means in its belly or ventral portion and having axial sockets in its leading and trailing ends, said harness having especially constructed portions anchored in said sockets.

Other objects, features and advantages will become more readily apparent from the following description and the accompanying sheet of illustrative drawings.

In the accompanying sheet of drawings wherein like numerals are employed to designate like parts throughout the views:

Figure 1 is a side elevational view showing the plug per se stripped of the harness and weight means;

Figure 2 is a view based on Figure 1 showing the harness and weight means with portions of the plug appearing in section;

Figure 3 is a bottom plan view of the structure seen in Figure 2; and

Figure 4 is a perspective view of the harness by itself.

Referring now to the drawings and first to Figure 1, the plug, construed as an entity but nevertheless a component of the over-all combination is denoted by the numeral 6. This is of wood, commercial plastics or other suitable light-weight material and it is usually buoyant. It is of any suitable length, cross-section and shape and is appropriately decorated to function as a lure or artificial bait. In the approximate center of the belly or ventral portion there is a right angularly extending recess 8. The belly portion is denoted at 10 and the recess is either referred to as recess means broadly or a pocket for reception of weight means to be later described. The pocket is closed at its upper end and open at its lower end. There is a shallow concavity in the trailing or tail end portion and this is denoted at 12 and forms a keeper seat. There is a suitably alined axial socket in the nose or leading end and this is denoted at 14 and also provides a keeper seat. These keeper seats are adapted to accommodate detents on the respective ends of an attachment, which has also been sometimes referred to loosely as an adapter, said attachment being denoted generally by the numeral 16. More specifically, the attachment is a longitudinally bowed resilient metal or equivalent harness. It takes the form of a narrow band or strap and therefore provides a conformable truss 18 which contacts and underlies the belly or ventral portion of the body 6 from one end to the other. It extends across the mouth of the pocket or recess where it serves to suspend and hold in place the insertable and removable weight means. The latter is characterized by at least two individual weights or sinkers one of which is denoted by the numeral 20 and the other by the numeral 22. It is within the purview of the invention to leave the pocket empty as shown in Figure 1, to use one weight or two weights, as is evident. The leading end of the harness has a return bend 24 which defines a tensioned detent or hook 26 and the latter is fitted removably in the socket 14. There is a similar tensioned return bend 28 at the trailing end and this has a reverse bend 30 which constitutes a keeper or second detent which is engageable in the keeper seat or socket means 12. The terminal portion 32 is apertured and flat and suitably shaped and constitutes a finger-grip. The latter facilitates inserting and removing the keeper 30. The resiliency of the over-all strap from which the harness is made serves to aptly maintain and yieldingly maintain both detents 26 and 30 in their respective keeper seats 14 and 12. The harness serves not only to hold the weights in place and to accommodate varying styles, colors and shapes of plugs but it also serves as a carrier for accessories. For example, the accessories here are multiple barbed hooks 34 and 36. Suitable straps or hangers 38 are struck out from the harness and provide attaching members for the hooks. There is a baffle plate 40 and this is appropriately fixed to the harness at the forward end thereof and it is in turn provided with an eye 42 to accommodate the fishing line 44.

The subject matter herein disclosed is an improvement on the plug, adapter harness combination or so-called variable multi-purpose lure disclosed in my copending application, Serial No, 219,397, filed under date of April 5, 1951 which issued as Patent No. 2,659,175.

Minor changes in the shape, size and arrangement of details coming within the field of invention claimed may be resorted to in actual practice, if desired.

Having described the invention, what is claimed as new is:

In a fish lure, a solid buoyant plug of elongate form provided at leading and trailing ends with axially positioned sockets providing individual keeper seats, said plug being provided at the center of its ventral portion with a right angularly disposed recess closed at its upper end and opening at its lower end through said ventral portion and providing a pocket for reception of insertable and removable weights, a readily attachable and detachable harness comprising a longitudinally bowed resilient narrow band spanning and contacting said ventral portion from its leading to its trailing end, the intermediate portion of said band bridging the open lower end of said pocket, said band being narrower than said open end of the pocket to expose portions of the latter and having constantly tensioned detents releasably fitted into their respective keeper seats, and selectively usable weights removably located in said pocket, said weights being seated on that portion of the band bridging said pocket, being held in the pocket solely by the cooperating bridging portion of the band, being wholly detached from the band, and said weights being of a cross-section greater than the width of said cooperating portion of said band.

References Cited in the file of this patent

UNITED STATES PATENTS

| | | |
|---|---|---|
| 61,625 | Martin | Jan. 29, 1867 |
| 1,807,283 | Dick | May 26, 1931 |
| 1,871,387 | Pflueger | Aug. 9, 1932 |
| 2,204,552 | Singleton | June 18, 1940 |
| 2,274,596 | Fink | Feb. 24, 1942 |
| 2,598,360 | Cummins | May 27, 1952 |